(12) United States Patent
Sumikawa et al.

(10) Patent No.: US 8,607,434 B2
(45) Date of Patent: Dec. 17, 2013

(54) METHOD FOR SURFACE TREATMENT OF METAL PLATE AND VEHICLE TREATED THEREBY

(75) Inventors: Tomonori Sumikawa, Osaka (JP); Katsuji Nishitani, Kobe (JP)

(73) Assignee: The Kinki Sharyo Co., Ltd., Osaka (JP)

( * ) Notice: Subject to any disclaimer, the term of this patent is extended or adjusted under 35 U.S.C. 154(b) by 266 days.

(21) Appl. No.: 12/965,224

(22) Filed: Dec. 10, 2010

(65) Prior Publication Data

US 2011/0079345 A1    Apr. 7, 2011

Related U.S. Application Data

(62) Division of application No. 12/302,139, filed as application No. PCT/JP2006/325017 on Dec. 15, 2006, now Pat. No. 8,205,318.

(30) Foreign Application Priority Data

Jun. 1, 2006   (JP) ................................. 2006-153218

(51) Int. Cl.
  *B23P 25/00*   (2006.01)
  *G09F 21/04*   (2006.01)

(52) U.S. Cl.
  USPC ................... 29/458; 40/591; 40/590; 40/589

(58) Field of Classification Search
  USPC ............................... 29/458; 40/589, 590, 591
  See application file for complete search history.

(56) References Cited

U.S. PATENT DOCUMENTS

| | | | |
|---|---|---|---|
| 74,530 A | 2/1868 | Harris et al. | |
| 369,305 A | 8/1887 | Vogel et al. | |
| 676,235 A | 6/1901 | Jackson | |
| 974,307 A | 11/1910 | Sweet | |
| 1,347,012 A | 7/1920 | Colony | |
| 2,336,016 A | 12/1943 | Jayne et al. | |
| 2,785,100 A | 3/1957 | Yaw | |
| 2,941,282 A | 6/1960 | Fromson | |
| 4,049,479 A | 9/1977 | Siker | |
| 4,325,177 A | 4/1982 | DePoorter | |
| 4,438,580 A | 3/1984 | Yamaji et al. | |
| 4,554,718 A | 11/1985 | Ollinger et al. | |
| 5,415,451 A | 5/1995 | Stanton | |
| 5,593,773 A * | 1/1997 | McKay et al. | 428/328 |
| 5,657,566 A | 8/1997 | Key | |
| 5,774,908 A * | 7/1998 | Hall | 4/617 |
| 5,804,315 A * | 9/1998 | Takimoto et al. | 428/402 |
| 6,378,444 B1 * | 4/2002 | Dastas et al. | 105/396 |
| 6,394,335 B2 * | 5/2002 | Meier et al. | 228/144 |
| 7,169,472 B2 * | 1/2007 | Raksha et al. | 428/403 |
| 7,677,846 B2 * | 3/2010 | VanderPol et al. | 409/132 |

(Continued)

FOREIGN PATENT DOCUMENTS

| | | |
|---|---|---|
| JP | 63-63241 | 4/1988 |
| JP | 63-80198 | 5/1988 |

(Continued)

*Primary Examiner* — Essama Omgba (74) *Attorney, Agent, or Firm* — Greenblum & Bernstein P.L.C.

(57) ABSTRACT

When surface grinding finish for decoration or other purposes is performed by applying a film to the front surface of a metal plate that is welded linearly with penetration from the rear surface side thereof. In this manner, the metal plate can be subjected to the surface grinding finish such that an appearance similar to weld marks is not created.

1 Claim, 6 Drawing Sheets

(56) References Cited

U.S. PATENT DOCUMENTS

| | | | |
|---|---|---|---|
| 7,729,026 B2* | 6/2010 | Argoitia et al. | 359/2 |
| 8,205,318 B2* | 6/2012 | Sumikawa et al. | 29/458 |
| 8,516,679 B2* | 8/2013 | Sumikawa et al. | 29/458 |
| 2004/0231208 A1 | 11/2004 | Pitt | |
| 2005/0039362 A1 | 2/2005 | Slesinski et al. | |
| 2005/0150147 A1 | 7/2005 | Berryman | |
| 2006/0207141 A1 | 9/2006 | Pitt et al. | |
| 2007/0214998 A1 | 9/2007 | Komaki et al. | |
| 2011/0203481 A1* | 8/2011 | Komaki et al. | 105/396 |

FOREIGN PATENT DOCUMENTS

| | | | | |
|---|---|---|---|---|
| JP | 2001-334934 | | 12/2001 | |
| JP | 2003040265 A | * | 2/2003 | B41M 5/26 |
| JP | 2003326597 A | * | 11/2003 | B29C 59/00 |
| JP | 2004-537744 | | 12/2004 | |
| JP | 2005-124725 | | 5/2005 | |
| JP | 2005-329412 | | 12/2005 | |
| JP | 2006-76316 | | 3/2006 | |
| WO | 03/001488 | | 1/2003 | |
| WO | 2005/110663 | | 11/2005 | |

* cited by examiner

METHOD FOR SURFACE TREATMENT OF METAL PLATE AND VEHICLE TREATED THEREBY

CROSS-REFERENCE TO RELATED APPLICATION

The present application is a divisional of U.S. application Ser. No. 12/302,139 (now U.S. Pat. No. 8,205,318), filed Nov. 24, 2008, which is a National Stage Application of PCT/JP2006/325017, filed Dec. 15, 2006, the disclosures of which are incorporated herein by reference in their entireties.

TECHNICAL FIELD

The present invention relates to a method for surface treatment of a metal plate in which a film for decoration or other purposes is applied to the front surface of the metal plate that is welded linearly with penetration from the rear surface side and to a vehicle treated thereby.

BACKGROUND ART

In recent years, decoration film materials such as foil tapes and resin-made tapes are applied to the surfaces of various vehicles including mass transportation systems such as train vehicles, buses, trucks, and passenger aircrafts to differentiate them from others and to display various information such as sense of the season, famous and historical places, landscapes, or advertisements.

Plate-like members can be joined together by placing one on the other and continuously irradiating perpendicularly the surface of one of the plate-like members with a moving laser beam to heat and melt a region extending inside the plate opposite to the plate irradiated with the laser beam. In this case, sufficient joint quality can be ensured by controlling the output power or moving speed of the laser beam such that the bottom of the formed molten pool does not reach the outer surface of the plate opposite to the irradiated plate. However, it is known that a ridge-like weld mark is visually prominent in a fold portion formed by the welding process on the outer surface of the plate-like member opposite to the irradiated plate-like member. In order to address this problem, a technique has already been proposed in which such a weld mark is made less prominent by employing, as the opposite plate-like member, a plate-like member having an outer surface grinding polished in advance substantially parallel to the direction of a weld line to be formed by the laser beam. This technique is particularly suitable for non-painted train vehicle body structures and for bodies of buses and trucks. (See, for example, Patent Document 1.)

[Patent Document 1] Japanese Patent Application Laid-Open No. 2005-329412.

DISCLOSURE OF THE INVENTION

Problems to be Solved by the Invention

The vehicle body of, for example, the train vehicle described in Patent Document 1 is also required to be used for decoration and advertisement purposes by applying the above-mentioned films such as resin tapes to its outer plate.

Figure 8:
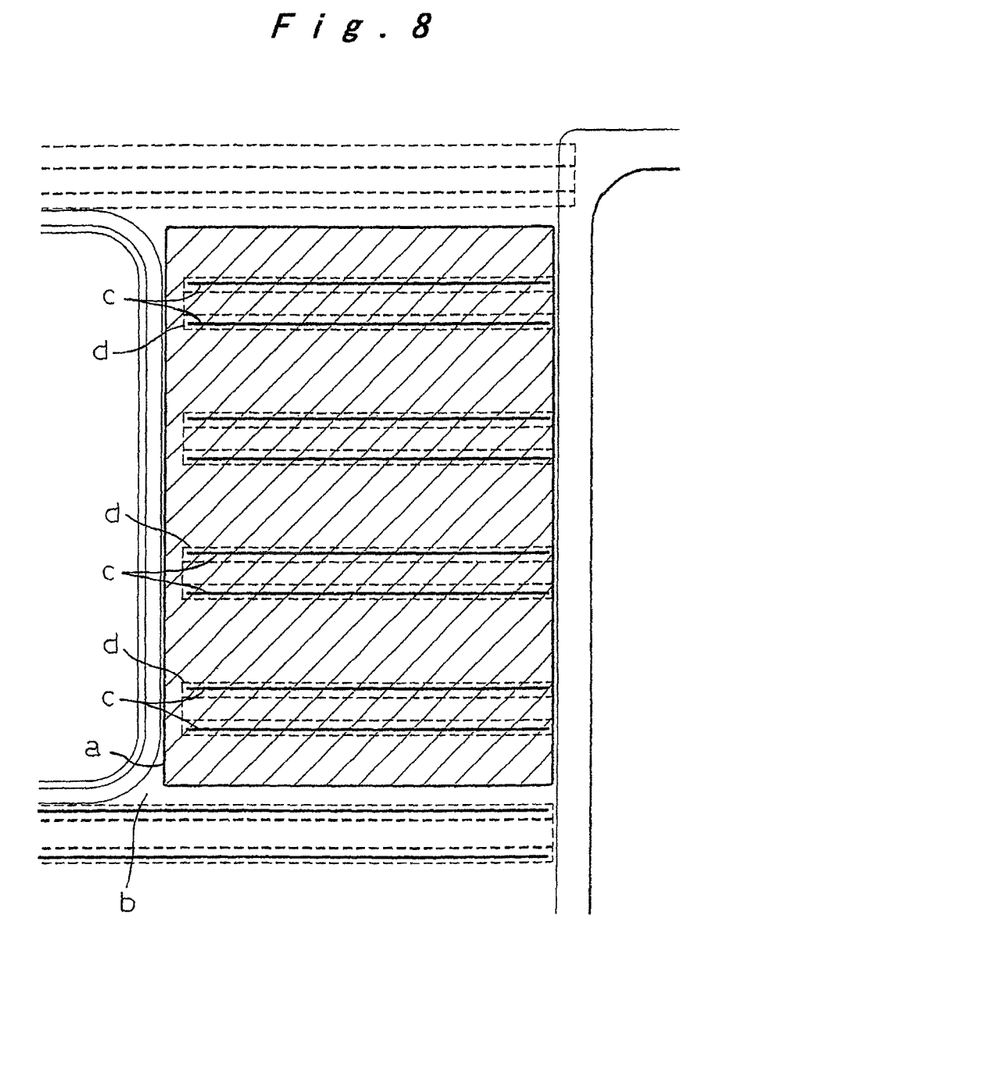
FIG. 8 is a side view illustrating the relationship between a metal plate with controversial weld marks, a film applied thereto, and weld lines.

To satisfy such a demand, the present inventor has decorated a vehicle by applying a film a, such as a resin tape, to an outer plate b thereof produced by using the technique described in Patent Document 1, as shown in FIG. 8. However, the inventor has noticed that the surface portions of the film a which are located on weld lines c described above have an appearance similar to that of a weld mark and that these surfaces are visually prominent.

In view of the above, the inventor has made various studies and found that, even when grinding finish or similar processing is performed to address folding, the weld mark-like appearance is formed. This is because the surface of the resin tape or the like is a kind of glossy surface and also the outer shape of the outer plate is reproduced on the applied resin tape. The above problem occurs not only in laser welding that causes a weld mark described in Patent Document 1 but also commonly in arc welding and other welding methods in which penetration from the welded side reaches the front surface of a metal plate from the rear surface side.

Based on the above findings, it is an object of the present invention to provide a method for surface treatment of a metal plate in which a film is applied such that a weld mark-like visual appearance is not present and to provide a vehicle treated by the method.

Means for Solving the Problems

To achieve the above object, the present invention provides a method for surface treatment of a metal plate. The method includes applying a film for decoration or other purpose to a front surface of the metal plate that is welded linearly with penetration from a rear surface side thereof. One feature of the method is that a plurality of the films are applied so as not to cover a weld line.

On the front surface of the metal plate welded linearly with penetration from the rear surface side thereof, a weld mark is formed along the weld line. However, in the above configuration, the surface treatment such as decoration is performed by applying the plurality of films so as not to cover the weld line. Therefore, even when the surface treatment through the use of the films is performed over a large area including the weld line, the applied films do not cover the weld line. Accordingly, the surface shape of the metal plate having the weld mark along the weld line is prevented from being reproduced. Therefore, even when the surface treatment is performed over a large area including the weld line, the applied films do not have a visual appearance similar to the weld mark.

In a vehicle having an outer plate composed of a metal plate that is welded linearly with penetration from the rear surface side thereof, the same effect as above can be obtained by performing surface treatment by applying a plurality of films to the front surface of the metal plate serving as the outer plate so as not to cover a weld line.

In another configuration, an edge of any of the plurality of films, a space between the edges of any two of the plurality of films, a boundary line between a transparent portion and an opaque portion, or a boundary line in a streak pattern is disposed along the weld line. In this manner, the line-shaped design formed by the edge of the film, the space between the edges of the films, the boundary line between the transparent portion and the opaque portion, or the boundary line in the streak pattern allows the weld mark along the weld line on the front surface of the metal plate to be made less prominent, whereby dull finishing or grinding finish can be omitted.

In another configuration, the front surface of the metal plate is dull-finished or grinding polished in a direction of linear welding. In this case, although the surface of the weld line portion on the metal plate is exposed or made visible when the film or the opaque portion of the film is applied so as not to cover the weld line, the effect of making the weld mark less prominent obtained by dull finishing or grinding finish is not impaired.

Another aspect of the present invention is a method for surface treatment of a metal plate in which decoration or the like is applied to a front surface of the metal plate that is welded linearly with penetration from a rear surface side thereof. The method is characterized in that a pattern having at least sections continuous or arranged in a direction of a weld line and discontinuous in a direction crossing the weld line is disposed so as to cover both a surface of a weld line portion and a surface of a non-weld line portion of the metal plate, the sections of the pattern being formed such that a difference in one of hue, chroma, and lightness between the section and each of the surface of the weld line portion and the surface of the non-weld line portion of the metal plate is larger than a difference in the one of hue, chroma, and lightness between the surface of the weld line portion and the surface of the non-weld line portion.

In the above configuration, the surface of the weld line portion, the surface of the non-weld line portion, and the pattern are simultaneously present on the surface of the metal plate. As described above, the sections of the pattern are formed such that the difference in one of hue, chroma, and lightness between the section and each of the surface of the weld line portion and the surface of the non-weld line portion is larger than the difference in the one of hue, chroma, and lightness between the surface of the weld line portion and the surface of the non-weld line portion. In addition, discontinuous gaps are formed at intervals in the direction crossing the weld line between the sections of the pattern which are at least continuous or arranged in the direction of the weld line. The above large difference is observed in surface portions of the metal plate which are exposed in the discontinuous gaps between the sections of the pattern. Therefore, not only in the case in which the surface of the weld line portion is located below the sections of the pattern, but also in the case in which the surface of the weld line portion and the surface of the non-weld line portion are exposed, the difference in hue, chroma, or lightness therebetween, i.e., the presence of the weld line, is made less visually prominent. This effect is obtained sufficiently when the area ratio of the surfaces of the sections of the pattern to the surface of the metal plate is greater than the ratio in one of the hue, chroma, or lightness therebetween. The larger the difference between the area ratio of the surfaces of the sections of the pattern and the ratio of one of the hue, chroma, or and lightness, the larger the effect.

The same effect as above can be obtained in a vehicle having an outer plate composed of a metal plate that is welded linearly with penetration from a rear surface side thereof. Specifically, in this vehicle, a pattern having at least sections continuous or arranged in a direction of a weld line and discontinuous in a direction crossing the weld line is disposed so as to cover both a surface of a weld line portion and a surface of a non-weld line portion on a front surface of the metal plate serving as the outer plate, the sections of the pattern being formed such that a difference in one of hue, chroma, and lightness between the section and each of the surface of the weld line portion and the surface of the non-weld line portion is larger than a difference in the one of hue, chroma, and lightness between the surface of the weld line portion and the surface of the non-weld line portion.

Other objects and features of the present invention will be described in the detailed description below and the drawings.

Each of the features of the present invention may be used alone or in various practicable combinations.

BEST MODE FOR CARRYING OUT THE INVENTION

With reference to FIGS. 1 to 7, embodiments of the metal plate surface treatment method of the present invention and a vehicle treated by the method are described in detail to facilitate understanding of the invention.

Each embodiment of the invention is a surface treatment method for decoration or other purposes. Specifically, a tape-like or sheet-like film 4 made of resin such as vinyl chloride resin or metal foil is applied to the front surface of a metal plate 1 that is welded linearly with penetration from the rear surface side, as shown in FIGS. 3 to 7. In an example shown in FIGS. 1 and 2, the metal plate 1 is used as an outer plate of a train vehicle. Specifically, in this example, a plurality of metal-made skeletal members 2 extending in the lengthwise direction of a vehicle 20 are placed on one another and welded linearly to portions of the rear surface of the metal plate 1 which are located between a window 21 and an entrance door 22. However, the present invention is not limited to the above embodiment and is applicable to general outer plates of other transportation systems and to any metal plate having any shape and used for any application, such as panels for non-vehicle use.

Figure 3:
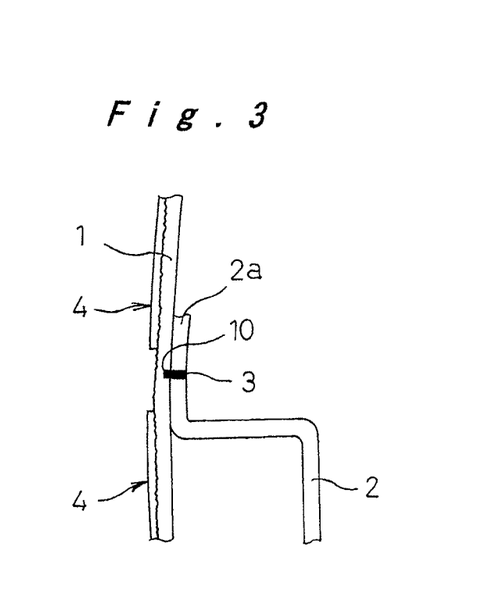
FIG. 3 is a cross-sectional view illustrating the relationship between a metal plate, a film applied thereto, and a weld line in an embodiment.
Figure 4:
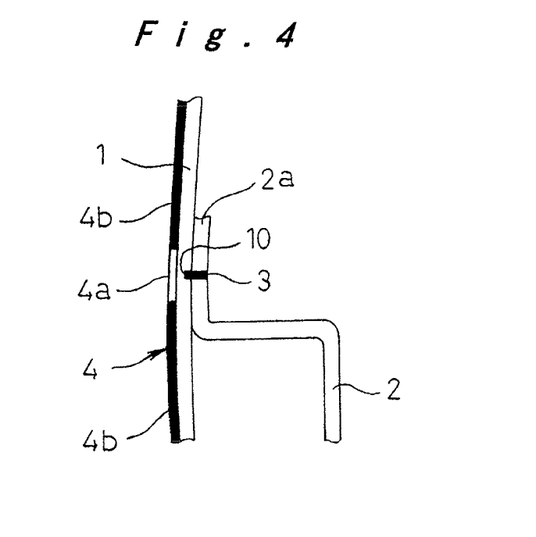
FIG. 4 is a cross-sectional view illustrating the relationship between the metal plate, the film applied thereto, and the weld line in another embodiment.

The skeletal member 2 shown in FIGS. 1 and 3 to 6 has a hat-like cross-section and is laser-welded to the rear surface of the metal plate 1. Specifically, as shown in FIGS. 3 to 6, L-shaped attachment flanges 2a on opposite sides of the skeletal member 2 are brought into contact with the rear surface of the metal plate 1 and are laser-welded such that penetration 10 is formed in the metal plate 1 from its rear surface side. In this case, a weld mark caused by "folding," i.e., the formation of a ridge line on the front surface side along a weld line 3, is formed on the front surface of the metal plate 1, and the weld mark is visually prominent. Such a weld mark is formed not only in laser welding and lap welding but also in a case in which weld penetration proceeds from the rear surface of the metal plate 1 but does not reach the front surface. As described above, the weld mark can be made less prominent by subjecting the front surface of the metal plate 1 to dull-finishing or grinding finish in the direction of the weld line 3 to obtain a rough surface that causes irregular reflection, as shown in FIGS. 3 and 4. However, when surface treatment is performed over a large area including the weld line 3 by applying the film 4 thereto, the shape of the outer surface of the metal plate 1 is smoothly reproduced on the film 4, so that the above effect of the roughened surface is impaired. Therefore, an appearance similar to the weld mark is created. This problem can be eliminated by forming the front surface of the film 4 into a rough surface. However, this is problematic when the smoothness of the film 4 after surface treatment is desired to be maintained for decoration, display, and other purposes.

Figure 1:
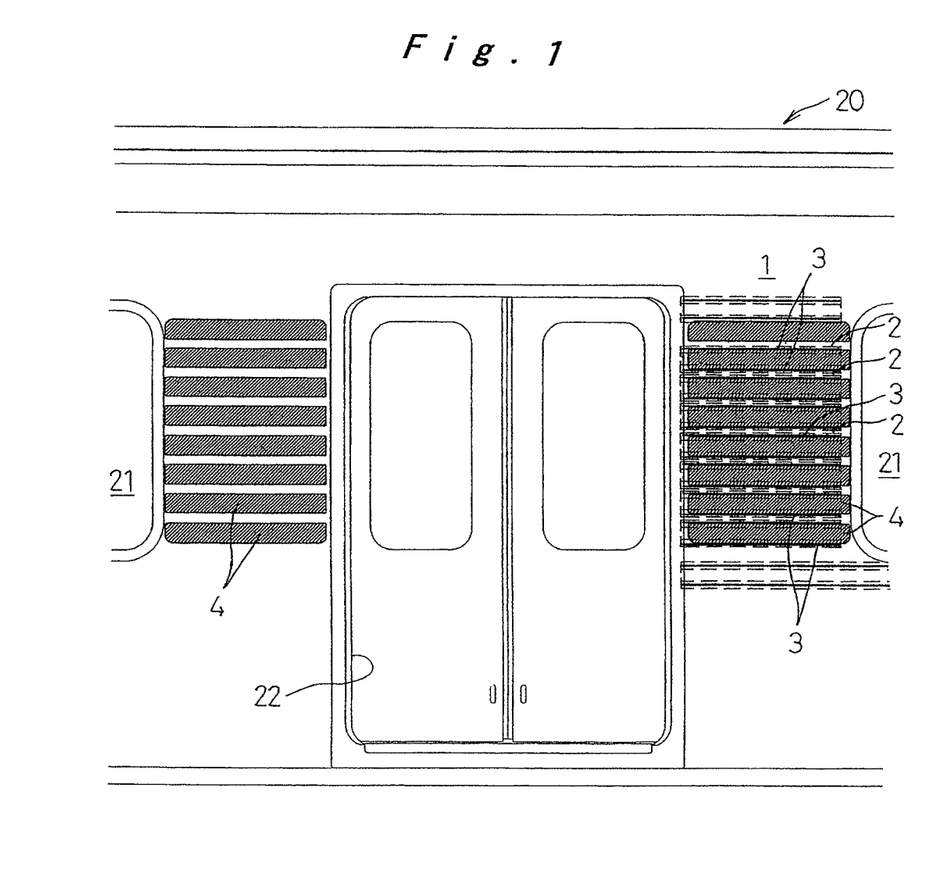
FIG. 1 is a side view illustrating a part of a train vehicle according to an embodiment of the present invention.
Figure 5:
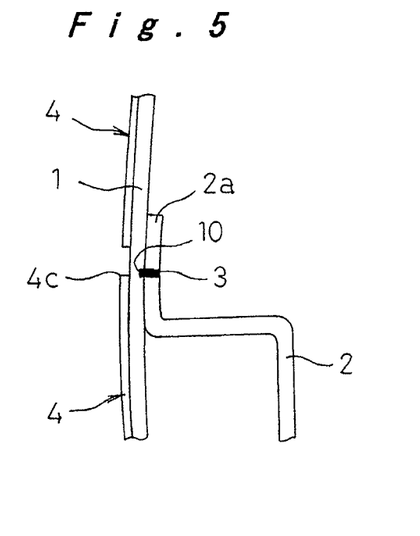
FIG. 5 is a cross-sectional view illustrating the relationship between the metal plate, the film applied thereto, and the weld line in yet another embodiment.

Accordingly, the embodiments, particularly the examples shown in FIGS. 1, 3, and 5, are basically characterized in that a plurality of films 4 are applied to the front surface of the metal plate 1 so as not to cover the weld line 3. In this case, a weld mark along the weld line 3 described above is formed on the front surface of the metal plate 1 welded linearly with the penetration 10 from the rear surface side. However, the opaque films 4 are applied so as not to cover the weld line 3, when the surface treatment is performed over a region including the weld line 3. Accordingly, the surface shape of the weld mark on the metal plate 1 is prevented from being reproduced on the applied films 4.

As described above, a weld mark along the weld line 3 on the front surface of the metal plate 1 welded linearly with the penetration 10 from the rear surface side can be made less prominent by subjecting the front surface of the metal plate 1 to dull-finishing or grinding finish. However, a weld mark-like appearance may be created when the surface shape of the metal plate 1 is reproduced on the applied film 4. However, this can be prevented when the method described above is used.

Figure 2:
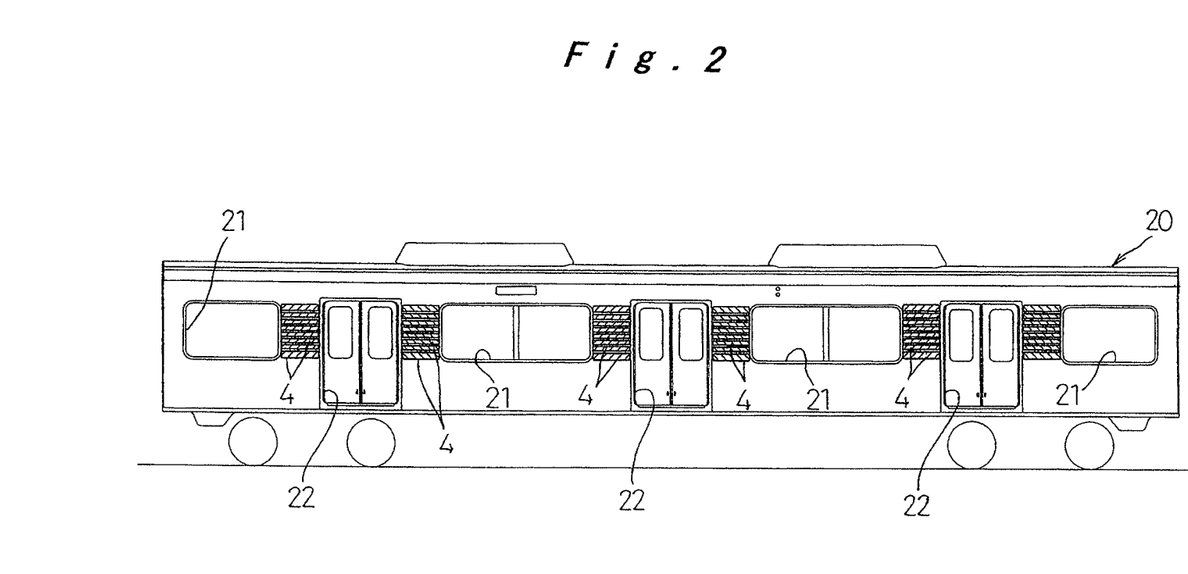
FIG. 2 is a general side view of the train vehicle shown in FIG. 1.

As described above, various vehicles including mass transportation systems such as train vehicles, buses, trucks, and passenger aircrafts are decorated by applying film materials such as tape or sheet materials made of resin or foil to a large area of their front surfaces to differentiate them from others and to display various information such as sense of the season, famous and historical places, landscapes, or advertisements. According to the above method, this can be achieved without the influence of the weld marks along the weld lines 3. Specifically, as shown in FIGS. 1 and 2, in the vehicle 20 or the like in which the metal plate 1 welded linearly with the penetration 10 from the rear surface side is used as an outer plate, a plurality of films 4 for surface treatment are applied to the front surface of the metal plate 1 serving as the outer plate so as not to cover the weld lines 3. In particular, in the train vehicle 20, a large number of skeletal members 2 extending in the lengthwise direction of the vehicle are often welded and joined to the rear surface of the metal plate 1 serving as the outer plate, as shown in FIG. 1. In such a case, the surface treatment method by applying the films 4 is useful.

As described above, the weld marks can be made less prominent by subjecting the outer surface of the metal plate 1 to dull-finishing or grinding finish. In such a case, it is desirable to apply a film 4 having transparent portions 4a and opaque portions 4b such that the transparent portions 4a are placed on areas corresponding to the weld lines 3, as shown in the examples shown in FIGS. 4 and 6. Even when the continuous film 4 is applied, the irregular reflection effect of the surface of the metal plate 1 caused by dull-finishing or grinding finish can be obtained through the transparent portions 4a. Therefore, although the surface shape of the metal plate 1 with weld marks is reproduced, a weld mark-like visual appearance can be prevented from being created without sectioning the film 4.

Figure 6:
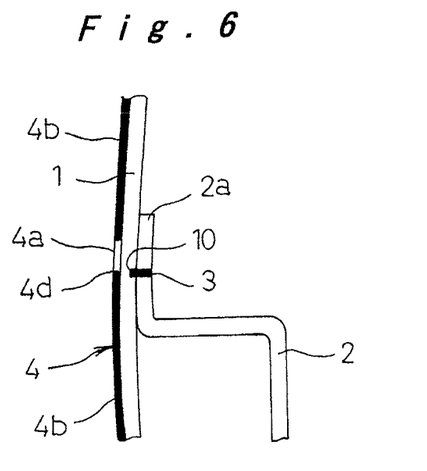
FIG. 6 is a cross-sectional view illustrating the relationship between the metal plate, the film applied thereto, and the weld line in still another embodiment.

As shown in FIG. 5, an edge 4c of the film 4 is disposed along the weld line 3. Although not illustrated, the distance between the edges of the films 4 may be reduced such that the gap therebetween is disposed along the weld line 3. In FIG. 6, the film 4 is disposed such that a boundary line 4d between the transparent portion 4a and the opaque portion 4b is disposed along the weld line 3. In these manners, the weld mark along the weld line 3 on the front surface of the metal plate 1 can be made less prominent through the line-shaped design formed by the edge 4c of the film 4 or the boundary line 4d. In these cases, dull-finishing or grinding finish can be omitted, and therefore the cost of a product, such as a vehicle, using the metal plate 1 can be reduced. Moreover, when the streak-like boundary lines are disposed along the weld lines 3, the weld marks along the weld lines 3 on the surface of the metal plate 1 can be made less prominent through the line-shaped design formed by the boundary lines without dull-finishing or grinding finish. In this case, the film 4 may be opaque, and the streak pattern may be formed by the difference in color, chroma, or density. Such a film is useful for places where a large number of weld lines 3 are arranged in parallel, for example, the portions between the windows 21 and the entrance doors 22, as shown in the exemplary embodiment in FIGS. 1 and 2. In some body structures, a wainscot panel and a frieze panel have a similar structure to that described above, and therefore, such a film can be effectively applied thereto.

Figure 7:
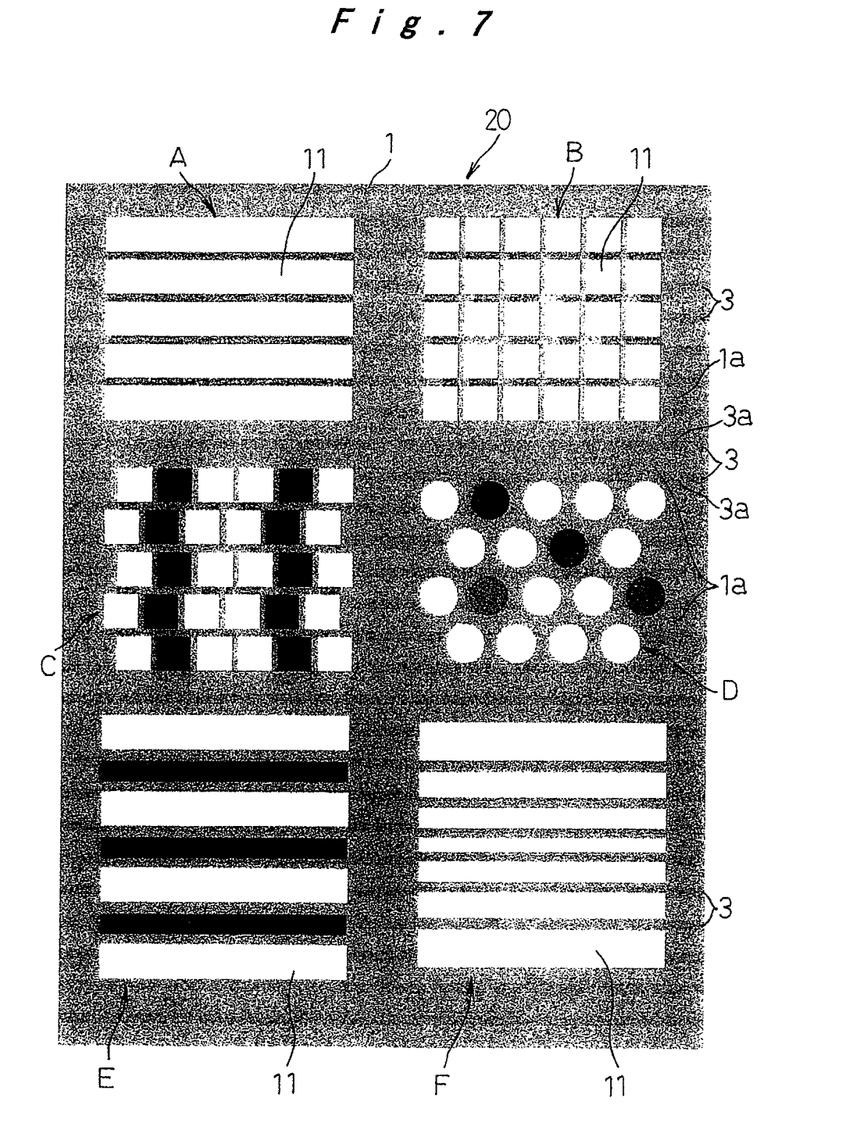
FIG. 7 is a diagram illustrating patterns used in a surface treatment method applied to a metal plate of an embodiment and a vehicle in which the metal plate is used as an outer plate of the vehicle.

FIG. 7 shows another embodiment. In the surface treatment method of this embodiment, when the front surface of a metal plate 1 welded linearly with penetration from the rear surface side is decorated, patterns 11 are applied to both the surfaces of weld line portions 3a and the surfaces of non-weld line portions 1a. The patterns 11 include, for example, group A, group B, group C, group D, group E, and group F as shown in FIG. 7. Each of the above patterns 11 has at least sections continuous or arranged in the direction of weld lines 3 and discontinuous in the direction crossing the weld lines 3. The sections of each pattern 11 are formed such that the difference in one of hue, chroma, and lightness between the section and each of the surfaces of the weld line portions 3a and the surfaces of the non-weld line portions 1a is larger than the difference in the one of hue, chroma, and lightness between the surfaces of the weld line portions 3a and the surfaces of the non-weld line portions 1a. In this manner, the surfaces of the weld line portions 3a, the surfaces of the non-weld line portions 1a, and the patterns are simultaneously present on the front surface of the metal plate 1. The sections of each pattern 11 are formed such that the difference in one of hue, chroma, and lightness between the section and each of the surfaces of the weld line portions 3a and the surfaces of the non-weld line portions 1a is larger than the difference in the one of hue, chroma, and lightness between the surfaces of the weld line portions 3a and the surfaces of the non-weld line portions 1a. In addition, discontinuous gaps are formed, at intervals in the direction crossing the weld lines 3, between the sections of each pattern 11 which are at least continuous or arranged in the direction of the weld lines 3. The above large difference is observed in surface portions of the metal plate 1 which are exposed in the discontinuous gaps between the sections of each pattern. Therefore, not only in the case in which the surfaces of the weld line portions 3a are located below the patterns 11, but also in the case in which the surfaces of the weld line portions 3a and the surfaces of the non-weld line portions 1a are exposed, the difference in hue, chroma, or lightness therebetween, i.e., the presence of the weld lines 3, can be made less visually prominent. This effect is obtained sufficiently when the area ratio of the surfaces of the sections of the pattern 11 to the surface of the metal plate 1 is greater than the ratio in one of the hue, chroma, or lightness therebetween. The larger the difference between the area ratio of the surfaces of the sections of the pattern 11 and the ratio of one of the hue, chroma, or and lightness, the larger the effect. As described above, each pattern 11 is formed such that the difference in one of hue, chroma, or lightness is greater than the difference in the one of hue, chroma, or lightness between the surfaces of the weld line portions 3a and the surfaces of the non-weld line portions 1a. Each pattern 11 may be formed such that the sections thereof are different in density, color, or chroma while the above-described difference is maintained, as in groups C, D, and E.

As has been described, even when the front surface of the metal plate 1 is an untreated mirror surface, the weld lines 3 can be made less visually prominent, and therefore dull-finishing and grinding finish can be omitted. Therefore, the same effect as above can be obtained in the vehicle 20 having the outer plate composed of the metal plate 1 welded linearly with penetration from the rear surface side thereof. Specifically, the patterns 11 each having at least sections continuous or arranged in the direction of the weld lines 3 and discontinuous in the direction crossing the weld lines 3 are disposed so as to cover both the surfaces of the weld line portions 3a and the surfaces of the non-weld line portions on the front surface of the metal plate 1 serving as the outer plate. The sections of each pattern 11 are formed such that the difference in one of hue, chroma, and lightness between the section and each of the surfaces of the weld line portions 3a and the surfaces of the non-weld line portions 1a is larger than the difference in the one of hue, chroma, and lightness between the surfaces of the weld line portions 3a and the surfaces of the non-weld line portions 1a.

The patterns 11 described above may be formed by applying film materials such as tape or sheet materials or by applying a coating.

INDUSTRIAL APPLICABILITY

When the front surface of a metal plate having linear weld marks is subjected to surface treatment by applying a film thereto, a visual problem may occur in which the shape of the metal plate with the weld marks is reproduced on the applied film. According to the present invention, the visual problem can be avoided.

What is claim is:
1. A method for surface treatment of a metal plate, the method comprising:
   applying a film for decoration or other purpose to a front surface of the metal plate welded linearly with penetration from a rear surface side thereof, wherein:
   the front surface of the metal plate has been subjected to dull-finishing or grinding finish in a direction of linear welding;
   the film includes a transparent portion and an opaque portion; and
   the film is applied such that the transparent portion is disposed on an area corresponding to a weld line; and
   providing the transparent portion between at least two opaque areas that define the opaque portion, wherein the transparent portion and opaque areas of the opaque portion are provided in a single layer that defines the film.

* * * * *